G. SMITH.
SOLDERING DEVICE FOR CAN SOLDERING MACHINES.
APPLICATION FILED OCT. 26, 1907.
913,065.  Patented Feb. 23, 1909.
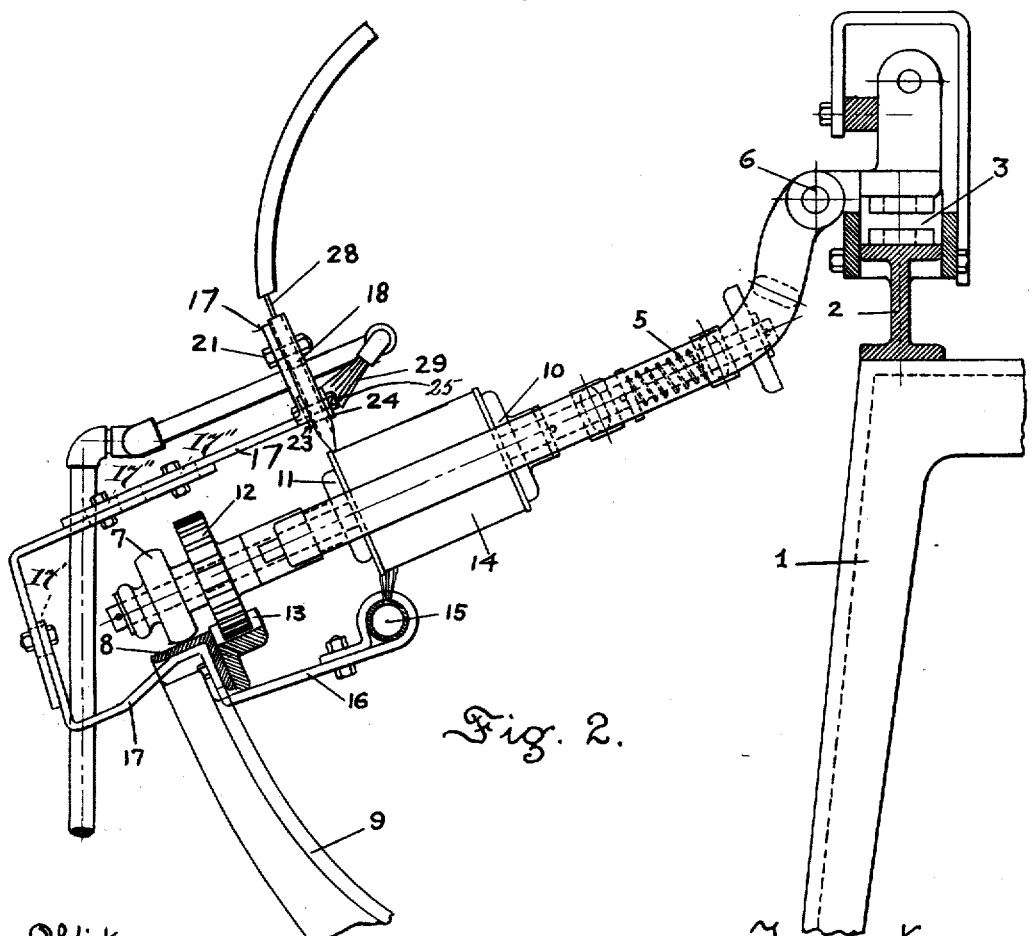

UNITED STATES PATENT OFFICE.

GEORGE SMITH, OF BALTIMORE, MARYLAND.

SOLDERING DEVICE FOR CAN-SOLDERING MACHINES.

No. 913,065.

Specification of Letters Patent.

Patented Feb. 23, 1909.

Application filed October 26, 1907. Serial No. 399,314.

*To all whom it may concern:*

Be it known that I, GEORGE SMITH, citizen of the United States of America, and resident of the city of Baltimore and State of Maryland, have invented certain new and useful Improvements in Soldering Devices for Can-Soldering Machines, of which the following is a specification.

My invention relates to a soldering iron adapted to apply solder to the outside of a can body at the joint between the body and the head and bottom, as the case may be, and is adapted to be used in that class of can-making machines in which a number of cans are held in suitable traveling conveyers and rotated as they are moved along through the machine, the soldering irons being mounted stationary above and in the path of the cans as they are moved through the machine.

Referring to the drawings,—Figure 1 is a vertical elevation of my improved soldering iron, showing its relation to the cans with which it is used. It also shows the part of the smoothing or finishing iron which is used in connection with the soldering iron. Fig. 2 is a vertical transverse section of parts of the can-making machine, showing the can carrier and can in full elevation and the soldering iron in end elevation.

Referring to Fig. 2,—1 is a frame-work upon which is mounted a track (2). (3) are a series of traveling blocks propelled by suitable means not shown, to each of which is connected a can carrier which consists of a frame (5) pivoted at (6) to the traveling block (3), and having upon its opposite end a roller (7), which rests and rolls upon a track (8), supported by the frame (9). The can is held in the frame (5) by means of head and bottom pressers (10) and (11). 12 is a pinion secured to the can pressers or holders by which the can may be rotated at any desired speed while traveling through the machine. 13 is a rack with which the pinion 12 meshes. It will be observed that the speed of rotation of the can (14) will be determined by the pitch diameter of the pinion (12).

In practice, I prefer to give to the pinion such a pitch diameter as to cause the can (14) to make two complete revolutions while passing under my soldering irons.
But this may be varied to suit any required conditions. 15 is a gas pipe supported in the bracket (16) and perforated with holes so as to spray a jet of flame upon the lower edge of the can (14). (17) is a bracket secured to the frame (9) and constructed in several parts, having slots 17' for vertical and $17^2$ for longitudinal adjustment. 18—18 and 19—19—19 are a series of soldering irons, the two end ones (18—18) being constructed with vertical projecting arms by which the whole structure may be supported. These vertical arms are provided with slots (20) through which the soldering irons are secured to the bracket (17) by means of bolts (21) so attached as to permit the soldering irons (18—18) and the others (19—19—19) which are connected to them, to have a combined vertical movement. Each of the soldering irons (18—18) and (19—19—19) are provided with vertical slots (22—22). 23 and 24 are bars of substantially identical length and width, one located upon each side of the soldering irons so that the bar 24 is directly behind bar 23 in Fig. 1. The soldering irons are secured to the bars by bolts 25—25, which pass through the slots (22) which slots are of such a size, the soldering irons being loosely held between the plates (23) and (24), that they may have an independent vertical adjustment or movement. The three central irons 19—19—19 and the latter iron 18 are beveled at their forward ends, that is to say, the end toward the approaching can, and at the same end are perforated with vertical holes (26) for the passage of wire solder through them. 27—27—27 are a series of irons similar in shape to the irons (18) and (19). They are mounted upon a frame identical with (17) and are located in the path of the cans just beyond the position of the soldering irons (18) and (19). They do not carry any solder, however, nor are they heated by the direct application of flame, but they are independent and have an independent vertical movement. 28—28 are a series of wires of solder, each provided with an independent automatic feed which is constantly in rotation and which feeds them continuously at a fixed rate of speed through the soldering irons to the can. 29—29 are gas jets located behind the soldering irons (18) and (19), and impinging upon the rear of the irons so as to maintain them at a suitable temperature. It will be noticed that the can carrier depends from its pivot (6) and the can is held at an angle of some 30° with the horizontal. The brackets carrying the soldering irons are so constructed as to cause the lower edges of the irons to rest upon the side bodies of the cans just above the lip of the top or bottom, as the case may be, and the purpose is to supply to the can body at this joint solder of a minimum quantity but sufficient for the purpose of effectively sealing the heads and bottoms to the bodies.

The operation of the device is as follows:—Flux is applied to the ends of the can bodies before the heads and bottoms are put on. The cans are then placed in the machine and passed through it carried by the arms (5) and rotated by the pinion (12). They are heated at their lower edge by gas jets (15) before they come to the soldering irons. When they strike the first iron (18) it is seated upon each can as it passes and thus serves to adjust approximately the following iron in which the first wire of solder is located. The heat of the can previously heated by the flame (15) and the heat of the iron (19) will have raised the solder to a temperature which when it makes contact with the can will at once melt and apply it to a portion of the circumference of the can body and to a portion of the joint between its head or bottom and the body which is in contact with the wire while the can is passing it. This contact will continue during about one-fourth of the circumference of the can while it is revolving. The solder thus applied will in part make contact with the edge of the soldering iron (19) located just beyond the wire solder and will be smoothed by that iron. A second quarter of the circumference of the can will pass in contact with the iron (19) before the second wire is reached, and any surplus of the solder first applied will thus be spread over the second quadrant. By the time the second wire is reached the can will have made a half revolution and the third quadrant will then contact with the second wire solder, which solder will be rubbed into the joint between the can body and the lip of the head or bottom and the surplus rubbed upon the remaining quadrant until the revolution of the can is completed. Upon reaching the third wire solder the first operation will be repeated and so with the fourth until by the time the can reaches the second iron (18) it will have made two complete revolutions and will have had solder applied to its entire circumference either by direct application of the solder of by the rubbing of the surplus solder around the can by the irons. The cans and the irons are very hot, hot enough to maintain the solder in a molten state. This is necessary in order to insure its penetration into the crease between the can body and the lip of the top or bottom. If a surplus of solder has been applied, or if only a usual amount has been applied, the solder will sometimes run and form lumps upon the side of the can which will prevent smooth and effective sealing. In order to spread this solder and to insure its uniform distribution a second series of irons (27—28) are used which are mounted beyond the first series, but which are cooler than the first series. They are not heated at all and no heat is applied to the cans after they leave the first series of soldering irons. Hence by the time they have passed the second series of irons the solder has been completely rubbed down into the joint and become cool enough to remain smooth.

It will be understood that my form of soldering iron may be applied to any style of can soldering machine in which the cans are caused to travel successively past a stationary point and revolved. So my iron may be made of any size; the sections may be of any length or of any number, and they may be located at any point in the path of the travel of the cans. Any desired temperature may be used with them which will insure the application of solder in the manner desired. The solder may be in any suitable form.

Having thus described my invention, what I claim and desire to secure by Letters Patent is:

1. In a can soldering machine of the class in which a series of cans are moved through the machine and rotated, the combination of a soldering iron located in the path of the cans and in position to make contact with them as they pass it and having a horizontal soldering surface, the soldering iron being perforated and supplied through its perforation with solder in wire form, with means for rotating the can.

2. In a can soldering machine of the class in which a series of cans are moved through the machine and rotated, the combination of a series of soldering irons mounted in a common line and stationary in the path of the cans and in position to make contact with the ends of the sides as they pass, all the irons having a horizontal bearing surface and each an independent automatic vertical adjustment, with means for rotating the can.

3. In a can soldering machine of the class in which a series of cans are moved through the machine and rotated, the combination of a series of soldering irons mounted in a common line and stationary in the path of the cans and in position to make contact with the ends of the sides as they pass, all the irons having a horizontal bearing surface and all being mounted so as to have a common vertical adjustment, with means for rotating the can.

4. In a can soldering machine of the class in which a series of cans are moved through the machine and rotated, the combination of a series of soldering irons mounted in a common line and in the path of the cans and in position to make contact with them as they pass, all the irons having a horizontal bearing surface and all being mounted so as to have a common vertical adjustment, and each an independent vertical adjustment, with means for rotating the can.

Signed by me at Baltimore, Maryland, this 3rd day of October, 1907.

GEORGE SMITH.

Witnesses:
 EDWARD L. BASH,
 B. SCHROETER.